US008418575B2

(12) United States Patent
Schneider et al.

(10) Patent No.: US 8,418,575 B2
(45) Date of Patent: Apr. 16, 2013

(54) METHOD FOR SHIFTING A NEUTRAL STATE OF AN AUTOMATIC MULTI-STAGE TRANSMISSION

(75) Inventors: Hans-Jürgen Schneider, Werneck (DE); Thomas John, Sulzheim (DE); Mario Bühner, Gerolzhofen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 1091 days.

(21) Appl. No.: 12/151,874

(22) Filed: May 9, 2008

(65) Prior Publication Data

US 2009/0038424 A1 Feb. 12, 2009

(30) Foreign Application Priority Data

May 10, 2007 (EP) .................................... 07009368

(51) Int. Cl.
*F16H 59/00* (2006.01)
*F16H 61/00* (2006.01)
*F16H 63/00* (2006.01)
*F16H 3/08* (2006.01)
*F16H 61/20* (2006.01)
*B60W 10/00* (2006.01)

(52) U.S. Cl.
USPC .................. 74/335; 74/330; 477/76; 477/114

(58) Field of Classification Search .................... 74/329, 74/330, 331, 335, 336 R; 477/34, 40, 98, 477/76, 80, 114; 192/3.57, 3.61
See application file for complete search history.

(56) References Cited

U.S. PATENT DOCUMENTS

| 5,181,431 | A | * | 1/1993 | Zaiser et al. | 74/333 |
| 5,788,596 | A | | 8/1998 | Robinson et al. | |
| 5,845,531 | A | * | 12/1998 | Fraley et al. | 74/331 |
| 5,906,559 | A | * | 5/1999 | Murasugi et al. | 477/93 |
| 6,014,603 | A | | 1/2000 | Le Van | |
| 6,461,273 | B1 | * | 10/2002 | Davis et al. | 477/98 |
| 6,732,601 | B2 | * | 5/2004 | Suzuki | 74/336 R |
| RE38,615 | E | * | 10/2004 | Dresden et al. | 74/336 R |
| 6,951,149 | B2 | | 10/2005 | Yamamoto et al. | |
| 6,951,526 | B2 | | 10/2005 | Kuhstrebe et al. | |
| 7,077,024 | B2 | * | 7/2006 | Lauri et al. | 74/325 |
| 7,287,443 | B2 | * | 10/2007 | Kuhstrebe et al. | 74/335 |
| 2006/0172855 | A1 | * | 8/2006 | Pollak et al. | 477/70 |

FOREIGN PATENT DOCUMENTS

| DE | 198 45 604 | 1/2000 |
| DE | 199 28 374 | 12/2000 |
| EP | 0 709 602 A2 | 5/1996 |

(Continued)

OTHER PUBLICATIONS

Search Report dated Oct. 10, 2007 for the corresponding European Patent Application No. 07009368.7-2421.

(Continued)

*Primary Examiner* — Troy Chambers
*Assistant Examiner* — Michael Gonzalez
(74) *Attorney, Agent, or Firm* — Cozen O'Connor

(57) ABSTRACT

Method for shifting a neutral state of an automatic multi-stage transmission of a motor vehicle, where, to engage and to disengage gear stages of the transmission, shift couplings, at least one of which is equipped with a synchronizing device, can be actuated by a transmission actuator.

10 Claims, 1 Drawing Sheet

FOREIGN PATENT DOCUMENTS

| | | |
|---|---|---|
| EP | 0 841 505 | 5/1998 |
| EP | 1 403 571 | 3/2004 |
| EP | 1 835 204 | 9/2007 |
| FR | 2 732 278 | 10/1996 |
| JP | 04 277373 | 10/1992 |

OTHER PUBLICATIONS

Office Action dated May 20, 2008 issued for the counterpart European Patent Application No. 07 009 368.7, (4 pgs.).

* cited by examiner

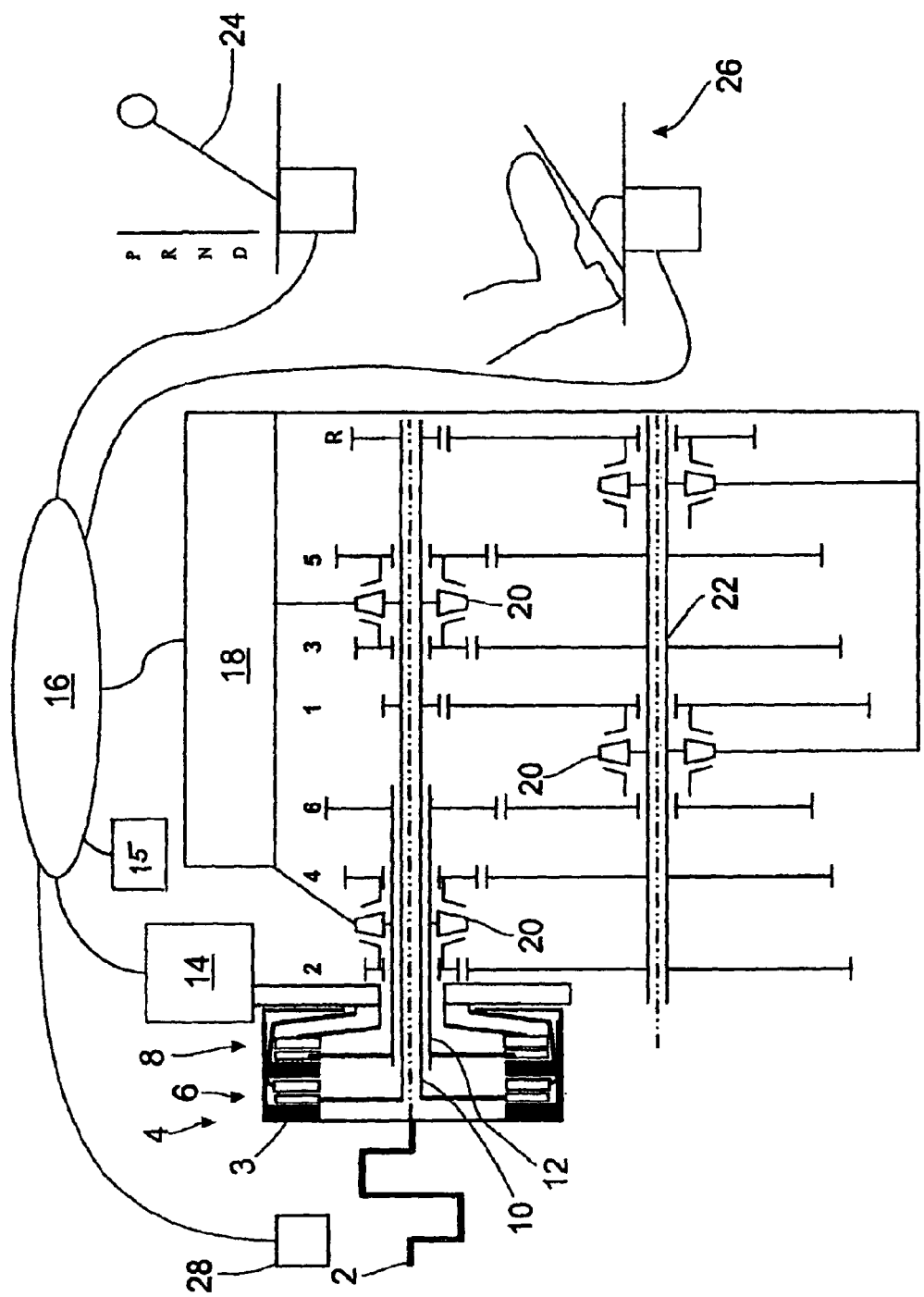

METHOD FOR SHIFTING A NEUTRAL STATE OF AN AUTOMATIC MULTI-STAGE TRANSMISSION

BACKGROUND OF THE INVENTION

1. Field of the Invention

The invention pertains to a method for shifting an automatic multi-stage transmission of a motor vehicle, where, to engage and disengage gear stages of the transmission, shift couplings can be actuated by assigned actuators.

2. Description of the Related Art

Shifting operations of automatic multi-stage transmissions such as manually shifted automatic transmissions or dual-clutch transmissions are usually controlled and regulated by a control unit, which sends and receives signals to and from the engine, the clutch device, and the transmission. The clutch and the transmission are actuated by assigned actuators, which are commanded by the control unit. During a shifting operation from a starting gear to a target gear, the clutch is opened by the clutch actuator to disconnect the drive train. Then, by means of the actuator assigned to the transmission, the starting gear is disengaged and the new target gear is engaged. Next, the clutch is closed again by the actuator to reconnect the drive train again, so that torque can be transmitted from the engine via the clutch and the new gear stage to the drive wheels of the vehicle. When just starting off, a corresponding procedure is used, namely, upon recognition of the desire to start off, the clutch is opened or kept open by the clutch actuating system; the target gear is automatically engaged; and finally the clutch is closed again so that torque can be transmitted.

The sole FIGURE is based on FIG. 1 in EP 1 835 204, which discloses an example of a manually shifted automatic transmission. In the FIGURE, an internal combustion engine 2 drives the input 3 of a double clutch mechanism 4, either directly or via a torsional vibration damper (not shown). The double clutch mechanism 4 consists essentially of the two clutch arrangements 6, 8, which are designed as dry clutches. The clutch arrangement 6 is assigned here to the first transmission input shaft 10, and the clutch arrangement 8 is assigned to the second transmission input shaft 12 of the double clutch transmission. The two clutch arrangements 6, 8 can be operated independently of each other by an electro-mechanical clutch actuator 14, which is controlled by a control unit 16. The gear stages 1, 3, 5 are assigned to the inner input shaft, and the gear stages 2, 4, 6 are assigned to the outer input shaft 12. A reverse gear stage R is also shown in FIG. 1. By means of the transmission actuator 18, the loose wheels of the gear stages can be connected for rotation in common to the transmission input shafts 10, 12 by way of the synchronizing units 20 and/or to the transmission output shaft 22, as a result of which the gear stages are engaged and the transmission output shaft 22 is connected for rotation in common by the engaged gear stage to the transmission input shaft assigned to that gear stage. A selector lever 24, furthermore, which can be moved into the various selectable positions P, R, N, D; a foot-operated service brake 26; and an engine control unit 28 are also connected to the control unit 16. Each synchronizing unit 20 includes a shift coupling and a synchronizing device.

When the selector lever is moved into the parking lock position "P", the control unit 16 or the engine control unit 28 determines whether the internal combustion engine 2 is running. By means of the actuator 18, furthermore, a gear stage of each input shaft 10, 12 is engaged while the clutch arrangements 6, 8 are open. If the engine 2 is running, it is turned off automatically by the control units 16, 28, and the two clutch arrangements 6, 8 are closed by the actuator 14. To release the parking lock, the service brake 26 must be actuated to allow the selector lever 24 to be moved. When the selector lever 24 is moved from the parking lock position "P" into one of the other positions "R", "N", or "D", at least one of the clutch arrangements 6, 8 is opened by the actuator 14. So that the internal combustion engine can be started, the clutch input 3 must be disconnected from the transmission output shaft 22, which can be done by having the actuator 14 open the two clutch arrangements 6, 8 and/or by having the actuator 18 disengage the engaged gear stages. A hydraulic unit 15 controls the flow of cooling oil in the transmission.

In the prior art, various methods for controlling the shifting operations of manually shifted automatic transmissions have already been disclosed. Thus, for example, DE 199 28 374 C1 describes a method in which, while the vehicle is being driven, a neutral position is selected by means of a shift lever. It is true that, if the vehicle is being driven, the clutch will be opened automatically in this case, but the currently engaged gear will not be disengaged as long as the vehicle is still moving.

Another method for shifting an automatic transmission is known from DE 198 45 604 C1. Here a shifting coupling of the transmission is pretensioned toward the open position of the transmission shift coupling by the transmission actuator even before the friction clutch, which is opened and closed by a clutch actuator, is completely open. Additional methods for shifting automatic multi-stage transmissions are known from U.S. Pat. No. 6,951,526, for example. Here, among other things, a method for use at low temperatures is proposed, according to which, to engage a transmission gear, several synchronizing devices of different gears are pretensioned in the gear-engaging direction to synchronize the speed of the corresponding transmission input shaft.

Especially in the case of automatic multi-stage transmissions with wet-running clutches, the drag torque transmitted via the clutches as a result of the high viscosity of the cooling oil at low temperatures has proven to be a problem. Under these conditions, the cooling oil adheres between the driven engine-side plates and the nondriven transmission-side plates and thus transmits a drag torque from the driven to the nondriven plates. Unless one of the gears assigned to the transmission input shaft is engaged in the transmission, these drag torques cause the engine-side half of the clutch to carry the transmission input shaft along at a certain rotational speed, which can be as high as the speed of the engine. When the vehicle is stationary, these rpm's cause comfort problems when a gear is engaged, because the shift coupling of the gear to be engaged must transmit a synchronizing torque to brake the transmission input shaft to a halt. To engage a start-off gear under such conditions, either the transmission actuator must exert a larger amount of synchronizing force, or the synchronizing time increases beyond a level which is acceptable to the driver.

In the prior art, solutions according to which a gear remains engaged while the transmission selector lever is in the neutral position have already been proposed. In this position, only the clutch is opened or remains opened. The disadvantage here, however, is that a defect in the clutch control unit can cause the clutch to close, and the vehicle can start off even though the selector lever is in the neutral position, which is undesirable. It is true that this safety risk could be eliminated by providing the clutch with a redundant check valve, so that a simple defect of the clutch control unit cannot lead to a situation in which the vehicle drives off while in neutral as described above. As a result of this measure, however, both the control unit and the hydraulic system (in a vehicle with a hydraulically controlled clutch and transmission) become more complicated, larger in size, and more expensive.

SUMMARY OF THE INVENTION

Against this background, an object of the invention is to prevent a loss of driving comfort when the selector lever is moved out of the neutral position to engage a gear.

According to the invention, a shift coupling of the transmission is actuated in the gear-engaging direction when the motor vehicle is in certain operating states. These operating states are preferably defined by the probability that there will be a loss of comfort when the gear is engaged. At least some of the shift couplings of the multi-stage transmission are preferably equipped with synchronizing devices, e.g. so called "synchro rings", which synchronize the rotational speed of the transmission input shaft with that of the pairs of gear wheels of the individual gears. Normally, one of the gear wheels of a pair is permanently connected to a transmission shaft (input shaft or output shaft), whereas the other gear wheel is designed as a loose wheel, which is connected for rotation in common to the assigned transmission shaft (output shaft or input shaft) by means of the shift coupling. The individual gear stages or drive gears of the transmission are created by the reduction ratios of the meshing pairs of gear wheels. The "shifting" of a gear is realized by means of the assigned shift coupling, which connects the transmission input shaft and the transmission output shaft to each other for rotation in common at the corresponding reduction ratio of the gear stage. When a gear is to be engaged, the rotational speed of the transmission input shaft is first brought into synchrony by the synchronizing device, and then a positive connection is established by means of the clutch. The "neutral state" of the transmission is defined in the following as the operating state in which no gear is engaged in the transmission and the selector lever of the transmission is in the neutral position "N".

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWING

The sole FIGURE is a system diagram of an automatic transmission according to the prior art, to which the inventive method is applied.

DETAILED DESCRIPTION OF THE PRESENTLY PREFERRED EMBODIMENTS

Because the general design of the selector lever is known, it will not be discussed in detail here. The only thing to be said about the functionality of the selector lever is that it is in working connection with the control unit responsible for the clutch and/or for the transmission. This can be done by way of a separate control unit or by one and same control unit. Essentially, the currently selected position of the selector lever is communicated to the control unit. The essential positions of the selector lever are normally the neutral position "N", a driving position "D", a reverse position "R", and a park position "P". The driver's desire to shift up or down can also be signaled to the control unit by means of the selector lever. The control unit can be a component of a higher-level control unit made up of various control units, or it can itself be considered a control unit responsible for commanding various hardware components. Aside from the drive unit, at least the following components are commanded by the control unit: the one or more clutch actuators, the transmission actuator, and a hydraulic unit, which controls the flow of cooling oil. The actuators for the clutch and the transmission can be designed as integrated hydraulic actuators in the form of hydraulic piston-cylinder units, or they can be, for example, electromechanical actuators with electrically driven motors and assigned actuator gearboxes.

No detailed explanation of the special design of the actuator system for the transmission and the clutch or of the multi-stage transmission and the clutch device will be given here, because such components are sufficiently well known in the prior art.

Regardless of the design of the actuators and of the other hardware components, it is advantageous in the inventive method that, in situations in which the transmission is in the neutral state and the drive engine of the motor vehicle is running, the effect of the drag torque acting on the opened clutch, which would cause the transmission input shaft to rotate as well, is reduced. To accomplish this, the shift couplings of the transmission are used to exert a braking action on the transmission input shaft in opposition to the drag torque. When the vehicle is stationary, the transmission input shaft is braked down to zero rpm's by the inventive synchronization of the minimum of one shift coupling.

According to a preferred method of the invention, exactly one shift coupling of the transmission is actuated in the direction toward the engagement of the assigned gear stage. It is also possible, however, for several shift couplings assigned to different gear stages to be actuated in the engaging direction by the transmission actuator.

According to the invention, the minimum of one shift coupling is actuated in the engaging direction when the selector lever of the transmission is in neutral or is moved into the neutral position. This can be, for example, the situation when the lever is moved from the park position "P" into the neutral position "N". According to the invention, the method is executed when the control unit detects the neutral position. If, however, the selector lever is moved from "D" to "N" while the vehicle is being driven, the one or more gears which are engaged are disengaged by the transmission actuators, and then the minimum of one shift coupling is actuated in the engaging direction. The corresponding procedure takes place when the vehicle is in reverse and the selector lever is moved from "R" to "N". It is possible for the clutch to be actuated immediately again in the engaging direction after the gear has been disengaged by the clutch, or the clutch can be actuated again in the gear-engaging direction to brake the shaft only after the transmission input shaft has reacted in a certain way, i.e., only after an increase in its rpm's has been detected.

According to a preferred method, the minimum of one shift coupling of the multi-stage transmission is assigned to a start-off gear stage. It is advantageous here that, upon initiation of a starting-off operation by moving the selector lever from N to one of the drive positions, i.e., to "D" or "R", the starting-off gear stage has already been synchronized, and the gear can be engaged more quickly. When the selector lever is moved to "D" or "R", the already-synchronized shift coupling is actuated further in the engaging direction, as a result of which the shift coupling is positively engaged.

Different shift couplings of the multi-stage transmission, which are shiftable independently of each other, can be actuated in the direction toward the engagement of the assigned gear stage. As an especially advantageous embodiment of the method, at least one shift coupling of a forward gear stage and one shift coupling of a reverse gear stage can be actuated simultaneously or sequentially in the direction toward the engagement of the starting-off gear stages. It is advantageous here that, regardless of whether the driver decides to go backwards or forwards, the associated starting-off stage has already been brought into synchrony, and the starting-off gear stage must merely be shifted to make positive connection with the associated transmission shaft.

According to an inventive variant of this method, the multi-stage transmission is designed as a dual-clutch transmission with two transmission input shafts, to each of which a clutch arrangement is assigned. Such dual clutch-transmissions have two independent paths of torque transmission in the transmission, between which it is possible to shift back and forth in a load-free manner. According to a most highly preferred embodiment of the method in which a dual-clutch transmission is used, when the transmission is in the neutral position, at least one shift coupling in each torque transmission path is actuated in the direction toward the engagement of a driving gear stage, most preferably the associated starting-off gear stage of the transmission path. It is possible here for the reverse gear stage and possibly a forward gear to be brought into synchrony in the one transmission path, and for at least one additional forward gear stage to be brought into synchrony in the other transmission path. The advantage here is that rapid changes of driving direction can be accomplished with greater comfort and require less synchronization work, because the corresponding gear stages have already been brought into synchrony and both transmission input shafts have been braked.

According to the invention, the synchronization of the minimum of one shift coupling brakes the assigned transmission input shaft of the multi-stage transmission. The transmission input shaft is to be braked here until the rotational speed of the input shaft falls below a speed threshold or until an essentially stationary state is reached. It is advantageous here for the speed of the transmission input shaft to be monitored and for the control device to use the speed of the transmission input shaft for the purpose of speed control in such a way that the shift coupling is actuated in a controlled manner in correspondence with that rotational speed. The shift coupling can be automatically controlled as a function of position, for example, or as a function of pressure. Which of these two alternatives will be used depends essentially on the transmission actuator, which can be designed to operate hydraulically, pneumatically, or electromechanically, or by the action of some other outside force. The position of the shift coupling can be automatically controlled, for example, by the use of position sensors, which are connected to the control unit and which detect displacements or pivotings of the shift rods or shift forks of the transmission. For the synchronization process, it can be effective to approach a predetermined shift position. The method offers the advantage that the synchronization process can be accomplished with a minimum of force and that therefore the engagement, by mistake, of the assigned gear stage can be reliably prevented. According to the invention, the engaging force or the engaging distance is increased until the rotational speed of the transmission input shaft reaches or falls below the threshold value. To avoid an unintended engagement of a gear stage, furthermore, it is also provided according to the invention that the engaging force or engaging distance is increased only as far as a certain maximum limit value, regardless of whether or not the synchronizing force applied at the maximum value is sufficient to brake the speed of the transmission input shaft. According to an advantageous elaboration, the maximum value can be determined as a function of operating parameters of the motor vehicle. Thus, for example, the maximum value increases when the transmission oil or the clutch oil is cold, because a stronger synchronizing force is necessary to engage the gear at lower temperatures. When the vehicle is stationary, furthermore, the shift coupling can be brought into synchrony only up to the point that the speed of the transmission input shaft falls below a certain threshold value of, for example, 3 rpm. Alternatively, the transmission input shaft can also be braked until the sensors detect that it has stopped completely.

The method according to the invention can be additionally supported in that, before or during the process of synchronizing the minimum of one transmission gear, the flow of cooling oil is stopped or at least sharply reduced by signals from the control unit to the hydraulic unit. This has the effect of reducing the drag torque by reducing viscosity as the oil is heated, which makes it easier in turn for the transmission input shaft to be braked.

According to the invention, speed sensors are used to measure the rotational speed of the transmission input shaft and to detect the speed of the transmission output/takeoff shaft, which is connected to the drive wheels. The current speed of the clutch input side or the engine output speed is also transmitted to the control unit.

It has already been mentioned that the shift coupling can be actuated in the engaging direction at a certain maximum pressure or with a certain maximum force.

According to the invention, furthermore, a time-monitoring function can be provided as part of the inventive method, according to which a termination criterion is established so that the method will be terminated after a certain defined period of time has passed or upon failure to reach the intended speed level or failure to reach the intended speed threshold. The shift coupling are then actuated again in the disengaging direction.

According to a preferred embodiment of the method, the first operating states are defined by an essentially stationary vehicle.

The first operating states, furthermore, can be defined by an operating temperature below a defined threshold temperature. What is involved here in particular is the transmission temperature, most preferably the oil temperature or possibly even the outside temperature. For example, the first operating states can be defined by a temperature of <10° C. As previously mentioned, the rotational speed of the transmission input shaft can be detected. It is possible to use a detected increase in the speed of a transmission input shaft as a criterion for initiating the inventive method. The detected increase in rpm's can represent the first operating state. By way of elaboration in the case of a dual-clutch transmission with two transmission input shafts, it is possible for only the assigned shift coupling of one of the transmission input shafts to be actuated in the engaging direction, namely, the clutches of the shaft which is experiencing an increase in rpm's because of drag torque. Then shift coupling of the other transmission input shaft remain disengaged as long as no increase in its rpm's as a result of drag torque has been detected.

According to an elaboration of the method, the inventive method is carried out even when the motor vehicle is coasting slowly. In this case, the speed of the transmission input shafts do not have to be braked to zero; on the contrary, they can, according to the invention, be braked to a synchronous speed corresponding to the speed of the vehicle and to that of the synchronized driving gear stage. The same is true for the previously mentioned threshold speed, which, in the case of a coasting vehicle, is calculated as the difference between the speed of the transmission input shaft and the speed of the transmission output shaft divided by the reduction ratio of the transmission.

According to an elaboration of the invention, no shift coupling is actuated in the engaging direction in the neutral state when second operating states of the motor vehicle are present. The second operating states of the vehicle, which are subsequent to the first operating states, can be defined by the point at which a certain operating temperature of the vehicle is reached. Thus, a second operating state can be reached when an operating temperature of, for example, 60° C. is exceeded. These operating states, furthermore, can also be defined on the basis of values which exceed a certain driving speed or coasting speed. A neutral state of the transmission in which no increase in the speed of the transmission input shaft is detected can also represent a second operating state.

By way of elaboration, the flow of cooling oil is not shut off by the control unit in the second operating states of the motor vehicle. This means that the cooling of the plates is not interrupted. Because of the way in which the system functions, the drag torque acting on the transmission input shaft during the second operating states is necessarily lower than the drag torque which occurs during the first operating states. Therefore, there is no need to stop the flow of cooling oil to reduce the drag torque.

An especially preferred embodiment of the invention provides a dual-clutch system, comprising a dual-clutch transmission, and a dual-clutch device with two wet-running plate clutches, where, in the neutral state of the dual-clutch transmission, at least one of the shift couplings of the transmission is actuated in the engaging direction, as a result of which the assigned gear stage is brought into synchrony, and as a result of which the speed of the transmission input shaft is braked. As previously explained, the inventive method can be applied to the transmission input shafts independently of each other. Different (first and second) operating states can be present in the two transmission branches, so that, in the neutral state, the claimed method is carried out in one of the transmission subunits but not in the other.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method of shifting an automatic transmission of a motor vehicle, the transmission having a plurality of gear stages, and shift couplings which can be actuated by means of a transmission actuator to engage and disengage the gear stages, at least one of said shift couplings being equipped with a synchronizing device, the method comprising:
    exerting a braking action on the transmission input shaft by at least one shift coupling to substantially stop rotation of the transmission input shaft due at least to drag torque;
    partially actuating the at least one shift coupling to partially engage a gear stage in a first operating state of the motor vehicle while the transmission is in neutral, and
    fully actuating the at least one shift coupling to fully engage the gear stage when one of a forward gear and a reverse gear is selected.

2. The method of claim 1, wherein the first operating state is represented by the vehicle being stationary.

3. The method of claim 1, wherein the first operating state is represented by the temperature of the transmission being below a predetermined threshold temperature.

4. The method of claim 1, wherein no shift coupling is actuated in the engaging direction in a second operating state of the vehicle while the transmission is in neutral.

5. The method of claim 1, wherein the at least one shift coupling engages a starting off gear.

6. The method of claim 5, wherein a shift coupling of a forward gear stage and a shifting coupling of a reverse gear stage are actuated simultaneously.

7. The method of claim 1, wherein the shift coupling is fully actuated when the transmission input shaft is rotating.

8. The method of claim 7, further comprising:
    braking the transmission input shaft until a rotational speed of the input shaft falls below a speed threshold or the rotation is stopped;
    monitoring the rotational speed of the transmission input shaft; and
    increasing at least one of an engaging force and an engaging distance of the at least one shift coupling until the rotational speed of the input shaft falls below a speed threshold or the rotation is stopped,
    wherein the shift coupling is actuated based at least in part on the monitored rotational speed of the transmission input shaft.

9. The method of claim 7, wherein the shift coupling is fully actuated only when the one of the forward gear and the reverse gear is selected.

10. The method of claim 9, wherein the one of the forward gear and the reverse gear is selected using a gear select lever.

* * * * *